(12) United States Patent
Park et al.

(10) Patent No.: US 12,051,799 B2
(45) Date of Patent: Jul. 30, 2024

(54) ANODE FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: So Hyun Park, Daejeon (KR); Hee Gyoung Kang, Daejeon (KR); Hae Suk Hwang, Daejeon (KR); Chan Young Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 212 days.

(21) Appl. No.: 17/505,428

(22) Filed: Oct. 19, 2021

(65) Prior Publication Data
US 2022/0123284 A1    Apr. 21, 2022

(30) Foreign Application Priority Data
Oct. 19, 2020   (KR) .................. 10-2020-0134979

(51) Int. Cl.
*H01M 4/36*   (2006.01)
*H01M 4/02*   (2006.01)
*H01M 10/0525*   (2010.01)

(52) U.S. Cl.
CPC ....... *H01M 4/366* (2013.01); *H01M 10/0525* (2013.01); *H01M 2004/021* (2013.01); *H01M 2004/027* (2013.01)

(58) Field of Classification Search
CPC .... H01M 10/0525; H01M 4/36; H01M 4/362; H01M 4/364; H01M 4/366;

(Continued)

(56) References Cited

U.S. PATENT DOCUMENTS

| | | | |
|---|---|---|---|
| 2005/0266314 A1* | 12/2005 | Sheem et al. | H01M 4/58 |
| | | | 429/231.8 |
| 2016/0285101 A1* | 9/2016 | Yoshio et al. | H01M 4/62 |
| 2022/0102708 A1* | 3/2022 | Wang et al. | H01M 4/36 |

FOREIGN PATENT DOCUMENTS

| | | | | |
|---|---|---|---|---|
| EP | 3886218 A1 * | 9/2021 | | H01M 4/38 |
| EP | 3994745 B1 * | 9/2022 | | H01M 4/1393 |

(Continued)

OTHER PUBLICATIONS

Office Action for Korean Patent Application No. 10-2020-0134979 issued by the Korean Patent Office on May 11, 2023.

*Primary Examiner* — Haroon S. Sheikh
*Assistant Examiner* — Kan Luo
(74) *Attorney, Agent, or Firm* — IP & T GROUP LLP

(57) ABSTRACT

An anode for a lithium secondary battery includes an anode current collector, and an anode active material layer formed on the anode current collector. The anode active material layer including a lower anode active material layer formed on the anode current collector and an upper anode active material layer formed on the lower anode active material layer. Each of the lower anode active material layer and the upper anode active material layer includes a first anode active material and a second anode active material having a hardness less than that of the first anode active material. A total intrusion amount of mercury to pores having a diameter of 3 nm to 10 μm in the anode active material layer measured by a mercury porosimeter is 0.27 ml/g or more.

11 Claims, 2 Drawing Sheets

(58) Field of Classification Search
CPC ..... H01M 2004/021; H01M 2004/027; H01M 4/0404; H01M 4/58–583
See application file for complete search history.

(56) References Cited

FOREIGN PATENT DOCUMENTS

| | | |
|---|---|---|
| JP | 2013-89327 A | 5/2013 |
| JP | 5677271 B2 | 2/2015 |
| KR | 10-2008-0095425 A | 10/2008 |
| KR | 10-2016-0149762 A | 12/2016 |
| KR | 10-2017-0007140 A | 1/2017 |
| KR | 10-2017-0031452 A | 3/2017 |
| KR | 10-2017-0055429 A | 5/2017 |
| KR | 10-2019-0076706 A | 7/2019 |
| WO | 2020/031869 A1 | 2/2020 |

* cited by examiner

ANODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0134979 filed on Oct. 19, 2020 in the Korean Intellectual Property Office (KIPO), the entire disclosure of which is incorporated by reference herein.

BACKGROUND

Field

The present invention relates to an anode for a lithium secondary battery and a lithium secondary battery including the same. More particular, present invention relates to an anode for a lithium secondary battery including a plurality of anode active materials and a lithium secondary battery including the same.

Description of the Related Art

A secondary battery which can be charged and discharged repeatedly has been widely employed as a power source of a mobile electronic device such as a camcorder, a mobile phone, a laptop computer, etc.

For example, a lithium secondary battery is highlighted due to high operational voltage and energy density per unit weight, a high charging rate, a compact dimension, etc.

For example, the lithium secondary battery may include a cathode, an anode, an electrolyte, a separation layer (separator), etc. The anode may include an anode active material which may affect a charge/discharge capacity, a life-span, etc., of the lithium secondary battery.

The anode active material may include a material capable of intercalating and de-intercalating lithium ions, and may include, e.g., a carbon-based negative active material such as a natural graphite or an artificial graphite.

A change of a crystal structure of the carbon-based anode active material may be suppressed during insertion and deintercalation of lithium ions, and thus the carbon-based anode active material may provide continuous charging and discharging properties and improved life-span characteristics. If a density of the anode active material becomes greater, a capacity of the lithium secondary battery may be further improved.

For example, Korean Published Patent Application No. 10-2017-0007140 discloses an anode for a lithium secondary battery including various types of graphite having different shapes and properties.

SUMMARY

According to an aspect of the present invention, there is provided an anode for a lithium secondary battery providing improved capacity and reliability.

According to an aspect of the present invention, there is provided a lithium secondary battery providing improved capacity and reliability.

According to exemplary embodiment, an anode for a lithium secondary battery includes an anode current collector, and an anode active material layer formed on the anode current collector. The anode active material layer includes a lower anode active material layer formed on the anode current collector and an upper anode active material layer formed on the lower anode active material layer. Each of the lower anode active material layer and the upper anode active material layer includes a first anode active material and a second anode active material having a hardness less than that of the first anode active material. A total intrusion amount of mercury to pores having a diameter of 3 nm to 10 μm in the anode active material layer measured by a mercury porosimeter is 0.27 ml/g or more.

In some embodiments, an amount of the second anode active material may be greater than an amount of the first anode active material in the lower anode active material layer, and an amount of the first anode active material may be greater than an amount of the second anode active material in the upper anode active material layer.

In some embodiments, a weight ratio of the first anode active material relative to the second anode active material in the lower anode active material layer may be from 0.1 to 0.85.

In some embodiments, a weight ratio of the second anode active material relative to the first anode active material in the upper anode active material layer may be from 0.1 to 0.85.

In some embodiments, the first anode active material may have a single-particle shape.

In some embodiments, the second anode active material may have a secondary particle structure in which primary particles are assembled.

In some embodiments, a hardness ratio of the first negative active material relative to the second negative active material is from 1.1 to 1.5.

In some embodiments, an average particle diameter (D50) of the first anode active material may be from 5 μm to 10 μm, and an average particle diameter (D50) of the second anode active material may be from 12 μm to 20 μm.

In some embodiments, a thickness ratio of the upper anode active material layer relative to the lower anode active material layer may be from 0.66 to 1.5.

In some embodiments, a microporosity of the anode active material layer represented by Equation 1 may be 25% or less:

$$\text{Microporosity} = B/A \times 100(\%) \qquad \text{[Equation 1]}$$

In Equation 1, A is a total intrusion amount of mercury into pores with a diameter from 3 nm to 10 μm measured by a mercury porosimeter, and B is a total intrusion amount of mercury into pores with a diameter from 3 nm to 100 nm measured by the mercury porosimeter.

In some embodiments, each of the lower anode active material layer and the upper anode active material layer further includes 1 part by weight to 5 parts by weight of a plate-shaped conductive material based on 100 parts by weight of the first negative active material and the second negative active material.

According to exemplary embodiments, a lithium secondary battery includes an electrode assembly comprising the anode for a lithium secondary battery of the above-described embodiments and a cathode facing the anode, and an electrolyte impregnating the electrode assembly.

According to exemplary embodiments, an anode for a lithium secondary battery may include an anode active material layer having a double-layered structure of a lower anode active material layer and an upper anode active material layer, and each of the lower anode active material layer and the upper anode active material layer may include two types of anode active materials having different hardness. Accordingly, a density of the anode active material may be enhanced.

Further, damages of a porous structure in anode active material particles may be prevented during a pressing process, and a ratio of isolated pores and micro pores may be decreased, The lithium secondary battery including the above-described may provide high capacity, and enhanced life-span and rate properties.

DETAILED DESCRIPTION OF THE EMBODIMENTS

According to example embodiments of the present invention, an anode for a lithium secondary battery including a multi-layered anode active material layer and a plurality of types of an anode active material and having improved capacity and rate capability. Further, a lithium secondary battery including the anode is provided.

Figure 1:
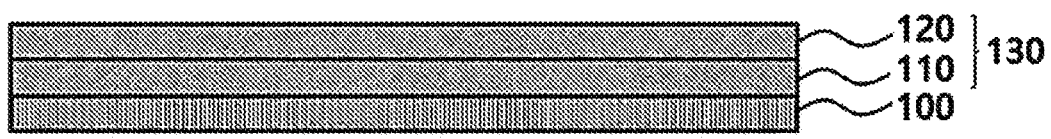
FIG. 1 is a schematic cross-sectional view illustrating an anode for a lithium secondary battery in accordance with exemplary embodiments.

Hereinafter, the present invention will be described in detail with reference to examples and the accompanying drawings. However, those skilled in the art will appreciate that such embodiments described with reference to the examples and the drawings are provided to further understand the spirit of the present invention and do not limit subject matters to be protected as disclosed in the detailed description and Referring to FIG. 1, an anode 10 for a lithium secondary battery may include an anode current collector 100 and an anode active material layer 130 formed on the anode current collector.

In an embodiment, the anode active material layer 130 may be formed on one surface or both surfaces (one surface and the other surface) of the anode current collector 100.

The anode active material layer 130 may include a lower anode active material layer 110 formed on the anode current collector 100 and an upper anode active material layer 120 formed on the lower anode active material layer 110.

In an embodiment, another layer including a commonly known material that may be used for an anode for a lithium secondary battery may be additionally formed at interfaces of the anode current collector 100 and the lower anode active material layer 110 and the upper anode active material layer 120.

In some embodiments, the lower anode active material layer 110 and the upper anode active material layer 120 may be in contact with each other.

The anode active material layer 130 may include a first anode active material and a second anode active material having a lower hardness than that of the first anode active material.

For example, the lower anode active material layer 110 may include the first anode active material and the second anode active material. The upper anode active material layer 120 may include the first anode active material and the second anode active material.

In an embodiment, in the lower anode active material layer 110, an amount of the second anode active material may be larger than that of the first anode active material. In the upper anode active material layer 120, an amount the first anode may be larger than that of the second anode active material.

In this case, a density of the anode active material may be increased. Further, an effective porosity of the anode active material layer may be improved, a ratio of micro-pores in the anode active material layer may be decreased. Accordingly, a battery having high capacity, enhanced life-span and rate capability may be achieved.

In an embodiment, a weight ratio of the first anode active material relative to the second anode active material in the lower anode active material layer 110 may be from 0.1 to 0.85. Within the above range of the weight ratio, the anode active material having high density may be efficiently obtained, and the ratio of micro-pores may be further reduced.

Accordingly, the battery having high capacity, enhanced life-span and rate capability may be achieved. Preferably, the weight ratio may be from 0.15 to 0.7, more preferably, from 0.3 to 0.6.

In an embodiment, a weight ratio of the second anode active material relative to the first anode active material in the upper anode active material layer 120 may be from 0.1 to 0.85. Within the above range of the weight ratio, excessive transfer of damages to the lower anode active material layer 110 may be prevented during a pressing process.

Additionally, the effective porosity may be more easily obtained, and the ratio of micro-pores may be further reduced. Accordingly, the battery having high capacity, enhanced life-span and rate capability may be achieved. Preferably, the weight ratio may be from 0.15 to 0.7, more preferably, from 0.3 to 0.6.

In an embodiment, a hardness ratio of the first anode active material relative to the second anode active material may be greater than 1 and less than or equal to 2. More preferably, the hardness ratio may be greater than 1 and less than or equal to 1.5, more preferably from 1.1 to 1.5. In this case, the anode active material with high density may be obtained while preventing collapse of pores in the anode active material.

In some embodiments, the hardness ratio may be calculated using values of change of pellet densities measured at different pressure intensities p1 and p2 (i.e., |pellet density at p1-pellet density at p2|). For example, the hardness is inversely proportional to the change value of the pellet densities, and thus the hardness ratio of the first anode active material relative to the second anode active material may be calculated using a ratio of a 1/the change value of pellet density of the first anode active material relative to a 1/the change value of pellet density of the second anode active material.

The first anode active material and the second anode active material may include materials capable of intercalating and de-intercalating lithium ions that may be commonly known in the related art. For example, the anode active material may include a carbon-based material such as crystalline carbon, amorphous carbon, a carbon composite, a carbon fiber, or the like, a Si-based materials such as Si, $SiO_x$ ($0<x<2$), Si/C, SiO/C, a Si-metal alloy, or the like, a lithium alloy, etc.

The first anode active material and the second anode active material may include materials of the same type (e.g., the graphite-based materials), or materials of different types.

In an embodiment, the first anode active material may have a single particle shape (e.g., a monolith structure). For example, the first anode active material may consist of the single particle. Preferably, the first anode active material may be artificial graphite having the single particle shape. In this case, the high-density anode active material may be effectively obtained, and the effective porosity of the anode active material layer may be easily achieved.

In an embodiment, the second anode active material may have a secondary particle structure in which a plurality of primary particles are assembled or aggregated. Preferably, the second anode active material may be artificial graphite having a secondary particle structure in which primary particles are assembled or aggregated. In this case, the high-density anode active material may be effectively obtained, and the effective porosity of the anode active material layer may be easily achieved.

In an embodiment, an average particle diameter ($D_{50}$) of the first anode active material may be from 5 μm to 10 μm, preferably from 6 μm to 9 μm.

In an embodiment, an average particle diameter ($D_{50}$) of the second anode active material may be from 12 μm to 20 μm, preferably from 15 μm to 19 μm.

For example, the average particle diameter ($D_{50}$) may be defined as a particle diameter based on 50% of a volume cumulative particle diameter distribution, and may be measured using a laser diffraction method. For example, the average particle diameter ($D_{50}$) may be calculated using a laser diffraction particle size measuring device.

In an embodiment, the effective porosity of the anode active material layer 130 may be from 0.27 ml/g or more, preferably 0.3 ml/g or more, more preferably 0.35 ml/g or more, or 0.38 ml/g or more. Within the above range of the effective porosity, the battery having high capacity, enhanced life-span and rate capability may be efficiently achieved.

The term "effective porosity" used herein may refer to an intrusion volume of mercury with respect to pores having a pore size of 3 nm to 10 μm measured by a mercury porosimeter.

The mercury porosimeter is a device by which an amount of mercury intruding into pores is measured by forcibly injecting mercury into the pores by pressing a porous sample so that a pore size (e.g., that may be calculated by Washburn's equation), a volume, a porosity of the porous sample is measured. For example, AutoPore VI 9500 manufactured by Micromertics USA may be employed. Specific mechanism and measurement using the mercury porosimeter are commonly known in the related art, and thus detailed descriptions thereof are omitted herein.

In an embodiment, a microporosity of the anode active material layer 130 represented by Equation 1 below may be 25% or less.

$$\text{Microporosity} = B/A \times 100 (\%) \qquad \text{[Equation 1]}$$

In Equation 1, A is a total mercury intrusion amount into pores with a diameter from 3 nm to 10 μm measured by a mercury porosimeter, and B is a total mercury intrusion amount into pores with a diameter from 3 nm to 100 nm measured by the mercury porosimeter.

In some embodiments, the microporosity of the anode active material layer 130 may be 23% or less, more preferably 21% or less. Within the above-described range of the microporosity, the battery having high capacity, enhanced life-span and rate capability may be efficiently achieved.

In an embodiment, a thickness ratio of the upper anode active material layer 120 relative to the lower anode active material layer 110 may be from 0.66 to 1.5. In this case, the high-density anode active material may be more easily achieved.

In an embodiment, the anode current collector 100 may include copper, stainless steel, nickel, aluminum, titanium, an alloy thereof, etc., preferably, may include copper or a copper alloy.

In an embodiment, the anode active material layer 130 may further include an anode binder. For example, the lower anode active material layer 110 and the upper anode active material layer 120 may each further include the anode binder.

The anode binder may promote adhesion between the anode active material particles and between the anode active material and the anode current collector. For example, the anode binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, the aqueous based binder such as styrene-butadiene rubber (SBR) together with the thickener such as carboxymethyl cellulose (CMC) may be used to enhance compatibility with the carbon-based active material.

In an embodiment, the anode active material layer 130 may further include a conductive material. For example, the lower anode active material layer 110 and the upper anode active material layer 120 may each further include the conductive material.

The conductive material may be added to facilitate an electron mobility between the anode active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In an embodiment, the anode active material layer 130 may include 1 part by weight to 5 parts by weight of a plate-shaped conductive material based on 100 parts by weight of the anode active material. For example, each of the lower anode active material layer 110 and the upper anode active material layer 120 may include 1 part by weight to 5 parts by weight of the plate-shaped conductive material based on 100 parts by weight of the first anode active material and the second anode active material, respectively.

In this case, damages to the anode active material may be prevented during a pressing process by a sliding effect of the plate-shaped conductive material. Accordingly, the effective porosity of the anode may be further increased, and the battery having high capacity, enhanced life-span and rate capability may be efficiently achieved.

In some embodiments, the plate-shaped conductive material may be a plate-shaped artificial graphite, and an average particle diameter ($D_{50}$) may be from 3 μm to 5 μm.

Figure 2:
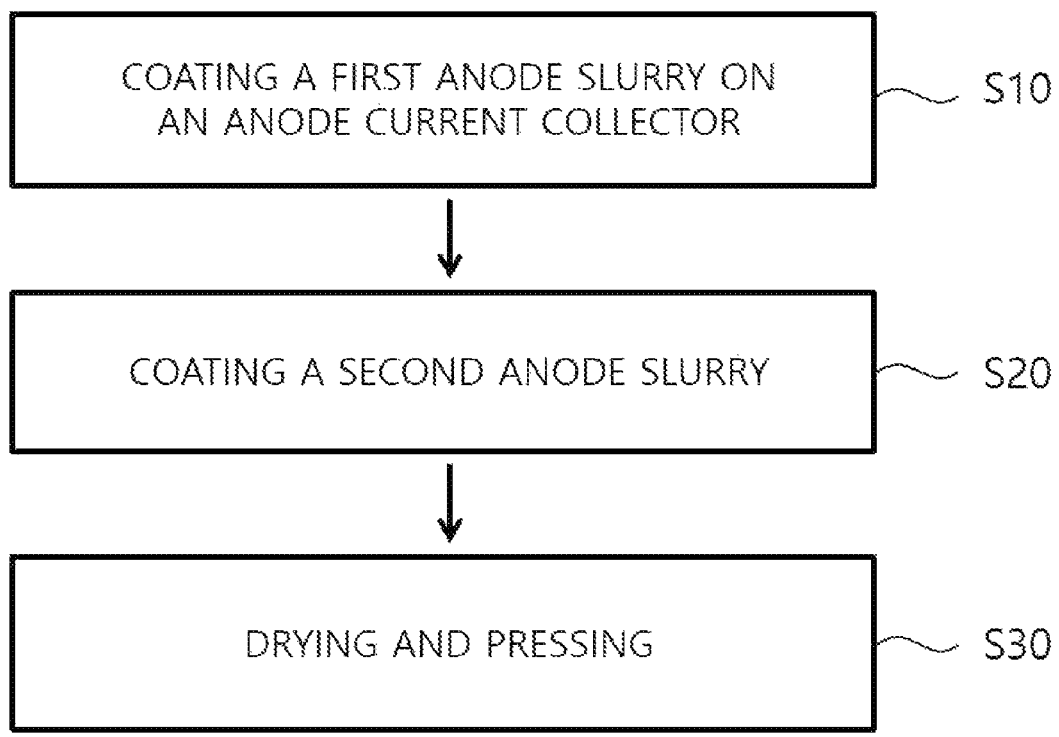
FIG. 2 is a flow diagram for describing a method of fabricating an anode for a lithium secondary battery in accordance with exemplary embodiments.

FIG. 2 is a flow diagram for describing a method of fabricating an anode for a lithium secondary battery in accordance with exemplary embodiments.

Referring to FIG. 2, in the method of fabricating an anode for a lithium secondary battery according to exemplary embodiments, a first anode slurry may be coated on an anode current collector to form a first anode slurry layer (e.g., in a step S10). A second anode slurry may be coated on the first anode slurry layer to form a second anode slurry layer (e.g., in a step S20).

The first anode slurry and the second anode slurry may include a first anode active material and a second anode active material having a hardness lower than that of the first anode active material, respectively.

Each of the first anode slurry and the second anode slurry may further include the anode binder, the solvent optionally with the conductive material as described above.

In an embodiment, both the first anode slurry and the second anode slurry may include the first anode active material and the second anode active material. In the first anode slurry, an amount of the first anode active material may be greater than an amount of the second anode active material. In the second anode slurry, an amount of the second anode active material may be greater than an amount of the first anode active material.

In an embodiment, the first anode slurry layer and the second anode slurry layer may be dried and pressed (e.g., in a step S30). For example, the first anode slurry layer and the second anode slurry layer may be dried together, and then pressed to form a lower anode active material layer and an upper anode active material layer. In this case, the first anode slurry layer and the second anode slurry layer may be dried through a single drying process, and the anode fabricating process may be simplified.

Alternatively, the first anode slurry may be coated and dried on the anode current collector to form the first anode slurry layer, and the second anode slurry may be coated on the first anode slurry layer and then dried to form the second anode slurry layer. Thereafter, the dried first and second anode slurry layers may be pressed to form the lower anode active material layer and the upper anode active material layer.

Figure 3:
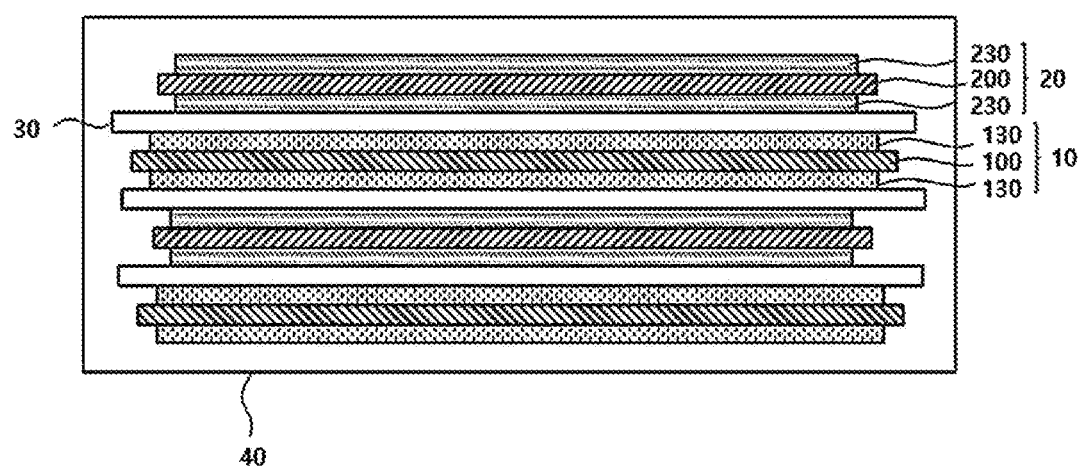
FIG. 3 is a schematic cross-sectional view illustrating a lithium secondary battery in accordance with exemplary embodiments.

FIG. 3 is a schematic cross-sectional view illustrating a lithium secondary battery in accordance with exemplary embodiments.

Referring to FIG. 3, a lithium secondary battery according to exemplary embodiments may include an anode 10, a cathode 20 and a separation layer 30 interposed between the cathode 20 and the anode 10.

The cathode 20 may include a cathode current collector 200 and a cathode active material layer 230 formed on the cathode current collector.

The cathode active material layer 230 may include a cathode active material optionally with a cathode binder and a conductive material.

For example, the cathode active material, the cathode binder, the conductive material, etc., may be mixed and stirred in a solvent to prepare a cathode slurry. The cathode slurry may be coated on the cathode current collector 200, and then dried and pressed to form the cathode 20.

The cathode current collector 200 may include, e.g., stainless steel, nickel, aluminum, titanium, copper, or an alloy thereof, and may preferably include aluminum or an aluminum alloy.

The cathode active material may include a material capable of reversibly intercalating and de-intercalating lithium ions. The cathode active material may include, e.g., a lithium metal oxide including a metal element such as nickel, cobalt, manganese, aluminum, or the like.

For example, the lithium metal oxide may be represented by Chemical Formula 1.

$Li_xNi_aCo_bM_cO_y$      [Chemical Formula 1]

In Chemical Formula 1, M may be at least one of Al, Zr, Ti, B, Mg, Mn, Ba, Si, W and Sr, $0.9 \leq x \leq 1.2$, $1.9 \leq y \leq 2.1$, $0.8 \leq a \leq 1$, $0 \leq c/(a+b) \leq 0.13$, and $0 \leq c \leq 0.11$.

In some embodiments, the lithium metal oxide may further include a coating element or a doping element. For example, the coating element or the doping element may include Al, Ti, Ba, Zr, Si, B, Mg, P, Sr, W, La, an alloy thereof or an oxide thereof. These may be used alone or in combination thereof. The cathode active material particles may be passivated by the coating or doping element, so that stability and life-span properties against a penetration of an external object may be further improved.

The cathode binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC). Preferably, the cathode binder may include a PVDF-based binder.

For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

The separation layer 30 may be interposed between the cathode 20 and the anode 10.

The separation layer 30 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 30 may also be formed from a non-woven fabric including a glass fiber with a high melting point, a polyethylene terephthalate fiber, or the like.

In exemplary embodiments, an electrode cell may be defined by the cathode 20, the anode 10 and the separation layer 30, and a plurality of the electrode cells may be stacked to form an electrode assembly having, e.g., a jelly roll shape. For example, the electrode assembly may be formed by winding, laminating or folding of the separation layer 30.

The electrode assembly may be accommodated in an outer case 40 together with an electrolyte to form the lithium secondary battery. In exemplary embodiments, the electrolyte may include a lithium salt and may be included in the form of a non-aqueous electrolyte solution containing an organic solvent.

The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the

[Measurement of Properties]

1. Average Diameter ($D_{50}$)

The average particle diameter ($D_{50}$) defined as a particle diameter based on 50% from a volumetric cumulative particle size distribution was measured using a laser diffraction method (microtrac MT 3000).

2. Pellet Density

The pellet density was measured according to the following method using MCP-PD51 manufactured by Nittoseiko Analytech.

(1) A height (H1, mm) of an empty pelletizer having a diameter of 20 mm was measured.

(2) 2 g of an anode active material sample was put into the pelletizer and maintained for 10 seconds while being pressed, and a height (Hp, mm) of the pelletizer was measured.

The pressure was changed from 2 kN to 8 kN during the measurement.

(3) The pellet density was calculated from Equation 2 below.

$$\text{Pellet Density} = 2/[\pi(20/2)^2 \times (Hp-H1)/1000] \quad \text{[Equation 2]}$$

3. Hardness Ratio

A hardness ratio between the first anode active material and the second anode active material was obtained using change values of the pellet densities measured at the pressure of 2 kN and 8 kN (i.e., |pellet density at 8 kN−pellet density at 2 kN|, hereinafter, referred to as a change value of the pellet density).

That is, the hardness is inversely proportional to the change value of the pellet density, and thus the hardness ratio of the first negative active material relative to the second negative active material was calculated as a ratio of a 1/a change value of pellet density of the first anode active material relative to a 1/a change value of pellet density of the second anode active material.

Example 1

Preparation of Anode Active Material

An artificial graphite having a single particle shape and having an average particle diameter ($D_{50}$) of 8 μm, a pellet density at 2 kN of 1.49, a pellet density at 8 kN of 1.85, and a 1/pellet density change value of 2.78 (hereinafter, referred to as HH—C) was prepared as a first anode active material.

An artificial graphite having a secondary particle structure in which primary particles were assembled and having an average particle diameter ($D_{50}$) of 16 μm, a pellet density at 2 kN of 1.52, a pellet density at 8 kN of 1.97 and a 1/pellet density change value of 2.22 (hereinafter, LH-C) was prepared as a second anode active material.

A hardness ratio of the HH—C relative to the LH-C was calculated as 1.25 according to the above calculation method.

Preparation of Anode Slurry

The HH—C, the LH-C, SBR as a binder and water as a solvent were mixed and stirred to form a first anode slurry. A mixing weight ratio of the HH—C, the LH-C and the SBR was 3:7:0.3.

The HH—C, the LH-C, SBR as a binder and water as a solvent were mixed and stirred to prepare a second anode slurry. A mixing weight ratio of the HH—C, the LH-C and the SBR was 7:3:0.3.

Fabrication of Anode

The first anode slurry was coated on a copper foil having a thickness of 10 μm, and dried to form a lower anode active material layer (a total thickness of the copper foil and the lower anode active material layer was 49 μm).

The second anode slurry was coated on the lower anode active material layer and dried to form an upper anode active material layer (a total thickness of the copper foil, the lower anode active material layer and the upper anode active material layer was 88 μm), and then pressed to from an anode of Example 1.

Example 2

An anode was prepared by the same method as that in Example 1 except that the mixing weight ratio of the HH—C and the LH-C was 4:6 in the preparation of the first anode slurry and the mixing weight ratio of the HH—C and the LH-C was 6:4 in the preparation of the second anode slurry.

Example 3

An anode was prepared by the same method as that in Example 1 except that the mixing weight ratio of the HH—C and the LH-C was 2:8 in the preparation of the first anode slurry and the mixing weight ratio of the HH—C and the LH-C was 8:2 in the preparation of the second anode slurry.

Example 4

An anode was prepared by the same method as that in Example 1 except that the mixing weight ratio of the HH—C and the LH-C was 1.5:8.5 in the preparation of the first anode slurry and the mixing weight ratio of the HH—C and the LH-C was 8.5:1.5 in the preparation of the second anode slurry.

Example 5

An anode was prepared by the same method as that in Example 1 except that the mixing weight ratio of the HH—C and the LH-C was 4.5:5.5 in the preparation of the first anode slurry and the mixing weight ratio of the HH—C and the LH-C was 5.5:4.5 in the preparation of the second anode slurry.

Example 6

An anode was prepared by the same method as that in Example 1 except that the mixing weight ratio of the HH—C and the LH-C was 1:9 in the preparation of the first anode slurry and the mixing weight ratio of the HH—C and the LH-C was 9:1 in the preparation of the second anode slurry.

Example 7

An anode was prepared by the same method as that in Example 1 except that 3 parts by weight of a plate-shaped artificial graphite (KS6L manufactured by TIMCAL) was added based on 100 parts by weight of the HH—C and the LH-C when preparing the first and second anode slurries.

Comparative Example 1

An anode was prepared by the same method as that in Example 1 except that only LH-C was used as the anode active material when preparing the first anode slurry, and only HH—C was used as the anode active material when preparing the second anode slurry.

Comparative Example 2

The HH—C, the LH-C, SBR as a binder and water as a solvent were mixed and stirred to prepare an anode slurry. A mixing weight ratio of the HH—C, the LH-C and the SBR was 5:5:0.3.

The anode slurry was coated on a copper foil having a thickness of 10 μm, dried to form an anode active material layer (a total thickness of the copper foil and the anode active material layer was 88 μm) and pressed to form an anode.

Comparative Example 3

The HH—C, the LH-C, SBR as a binder and water as a solvent were mixed and stirred to prepare an anode slurry. A mixing weight ratio of the HH—C, the LH-C and the SBR was 3:7:0.3.

The anode slurry was coated on a copper foil having a thickness of 10 μm, dried to form an anode active material layer (a total thickness of the copper foil and the anode active material layer was 88 μm) and pressed to form an anode.

Comparative Example 4

The HH—C, the LH-C, SBR as a binder and water as a solvent were mixed and stirred to prepare an anode slurry. A mixing weight ratio of the HH—C, the LH-C and the SBR was 7:3:0.3.

The anode slurry was coated on a copper foil having a thickness of 10 μm, dried to form an anode active material layer (a total thickness of the copper foil and the anode active material layer was 88 μm) and pressed to form an anode.

Experimental Example 1: Evaluation on Pore Property

1. Effective Porosity

Effective porosities of the anode active material layers according to Examples and Comparative Examples were measured using a mercury porosimeter (AutoPore VI9500, Micromeritics USA) by the procedures below.

(1) Measuring a Total Intrusion Amount (Ml/g) of Mercury to an Anode Sample

The anode samples (including the anode active material layer and the copper foil) were introduced to the mercury porosimeter. A pressure was applied from 0.5 psia to 60,000 psia, and a total intrusion amount of mercury into pores having a diameter from 3 nm to 10 μm was measured.

(2) Measuring a Total Intrusion Amount (Ml/g) of Mercury Based on Anode Active Material Layer Equation 3 below was multiplied to the total intrusion amount measured by the above (1) to perform a mass conversion so that a total intrusion amount of mercury to the anode active material layer was calculated, which was defined as an effective porosity.

$$\frac{\text{Mass per area of anode active material layer (mg/cm}^2\text{)}}{\text{Mass per area of anode active material layer (mg/cm}^2\text{)} + \text{Mass per area of copper foil (mg/cm}^2\text{)}} \quad \text{[Equation 3]}$$

2. Measuring Microporosity

Microporosities were measured using a mercury porosimeter (AutoPore VI9500, Micromeritics USA). The microporosity is defined by Equation 1 below, and the total intrusion amount of mercury was measured by the same method as that in the measurement of the effective porosity.

$$\text{Microporosity} = B/A \times 100(\%) \quad \text{[Equation 1]}$$

In Equation 1, A is a total intrusion amount of mercury into pores with a diameter from 3 nm to 10 μm measured by the mercury porosimeter, and B is a total intrusion amount of mercury into pores with a diameter from 3 nm to 100 nm measured by the mercury porosimeter.

Experimental Example 2: Evaluation on Rate Capability

An electrode assembly was prepared using the anode of Examples and Comparative Examples, a lithium foil (a counter electrode) and a porous polyethylene separator (thickness: 21 μm).

$LiPF_6$ was added to a solvent in which ethylene carbonate (EC) and ethylmethyl carbonate (EMC) were mixed in a volume ratio of 3:7 to prepare a 1.0 M $LiPF_6$ electrolyte solution.

A coin-type battery was manufactured according to a commonly known manufacturing process using the electrode assembly and the electrolyte.

For the coin-type batteries of Examples and Comparative Examples, rate capability evaluation was performed as follows:

For the coin-type batteries of Examples and Comparative Examples, charging and discharging were performed at 0.1 C to measure a charging capacity X.

Next, 2.0 C charging and 0.1 C discharging were performed, and a charging capacity Y was measured.

A percentage of the charge capacity Y to the charge capacity X (Y/X×100%) was calculated to evaluate the rate capability.

The results are shown in Tables 1 and 2 below.

TABLE 1

|  | Example 1 | Example 2 | Example 3 | Example 4 | Example 5 | Example 6 | Example 7 |
|---|---|---|---|---|---|---|---|
| Lower HH-C:LH-C | 3:7 | 4:6 | 2:8 | 1.5:8.5 | 4.5:5.5 | 1:9 | 3:7 |
| Upper HH-C:LH-C | 7:3 | 6:4 | 8:2 | 8.5:1.5 | 5.5:4.5 | 9:1 | 7:3 |
| Effective Porosity (ml/g) | 0.38 | 0.32 | 0.35 | 0.32 | 0.27 | 0.27 | 0.40 |

TABLE 1-continued

|  | Example 1 | Example 2 | Example 3 | Example 4 | Example 5 | Example 6 | Example 7 |
|---|---|---|---|---|---|---|---|
| Microporosity (%) | 19 | 21 | 22 | 23 | 25 | 24 | 20 |
| Rate Capability | 92.5 | 89.0 | 90.4 | 88.5 | 83.2 | 85.2 | 92.4 |

TABLE 2

|  | Comparative Example 1 | Comparative Example 2 | Comparative Example 3 | Comparative Example 4 |
|---|---|---|---|---|
| Lower HH-C:LH-C | 0:10 | 5:5 | 3:7 | 7:3 |
| Upper HH-C:LH-C | 10:0 | — | — | — |
| Effective Porosity (ml/g) | 0.21 | 0.245 | 0.26 | 0.24 |
| Microporosity (%) | 29 | 24 | 25 | 22 |
| Rate Capability | 81.2 | 82.5 | 80.4 | 85.5 |

Referring to Tables 1 and 2, the anodes of Examples provided improved effective porosity and microporosity compared to those from the anodes of Comparative Examples.

Further, the secondary batteries including the anodes of Examples provided greater rate capabilities that those from Comparative Examples.

In Examples 1 to 3 within the predetermined range of HH—C:LH—C, more enhanced effective porosities, microporosities and rate capabilities were achieved.

What is claimed is:

1. An anode for a lithium secondary battery, comprising:
   an anode current collector; and
   an anode active material layer formed on the anode current collector, the anode active material layer comprising a lower anode active material layer formed on the anode current collector and an upper anode active material layer formed on the lower anode active material layer,
   wherein each of the lower anode active material layer and the upper anode active material layer includes a first anode active material and a second anode active material having a hardness less than that of the first anode active material,
   wherein a total intrusion amount of mercury to pores having a diameter of 3 nm to 10 μm in the anode active material layer measured by a mercury porosimeter is 0.27 ml/g or more,
   wherein a ratio of a reciprocal of a change value of pellet density of the first anode active material relative to a reciprocal of a change value of a pellet density of the second anode active material is from 1.1 to 1.5.

2. The anode for a lithium secondary battery of claim 1, wherein an amount by weight of the second anode active material is greater than an amount by weight of the first anode active material in the lower anode active material layer, and an amount by weight of the first anode active material is greater than an amount by weight of the second anode active material in the upper anode active material layer.

3. The anode for a lithium secondary battery of claim 2, wherein a weight ratio of the first anode active material relative to the second anode active material in the lower anode active material layer is from 0.1 to 0.85.

4. The anode for a lithium secondary battery of claim 2, wherein a weight ratio of the second anode active material relative to the first anode active material in the upper anode active material layer is from 0.1 to 0.85.

5. The anode for a lithium secondary battery of claim 1, wherein the first anode active material has a single-particle shape.

6. The anode for a lithium secondary battery of claim 1, wherein the second anode active material has a secondary particle structure in which primary particles are assembled.

7. The anode for a lithium secondary battery of claim 1, wherein an average particle diameter (D50) of the first anode active material is from 5 μm to 10 μm, and an average particle diameter (D50) of the second anode active material is from 12 μm to 20 μm.

8. The anode for a lithium secondary battery of claim 1, wherein a thickness ratio of the upper anode active material layer relative to the lower anode active material layer is from 0.66 to 1.5.

9. The anode for a lithium secondary battery of claim 1, wherein a microporosity of the anode active material layer represented by Equation 1 is 25% or less:

Microporosity=$B/A$×100(%)  [Equation 1]

wherein, in Equation 1, A is a total intrusion amount of mercury into pores with a diameter from 3 nm to 10 μm measured by a mercury porosimeter, and B is a total intrusion amount of mercury into pores with a diameter from 3 nm to 100 nm measured by the mercury porosimeter.

10. The anode for a lithium secondary battery of claim 1, wherein each of the lower anode active material layer and the upper anode active material layer further comprises 1 part by weight to 5 parts by weight of a plate-shaped conductive material based on 100 parts by weight of the first anode active material and the second anode active material.

11. A lithium secondary battery, comprising:
   an electrode assembly comprising the anode for a lithium secondary battery of claim 1 and a cathode facing the anode; and
   an electrolyte impregnating the electrode assembly.

* * * * *